H. OGBORN.
Grain Separator.
No. 90,291. Patented May 18, 1869.
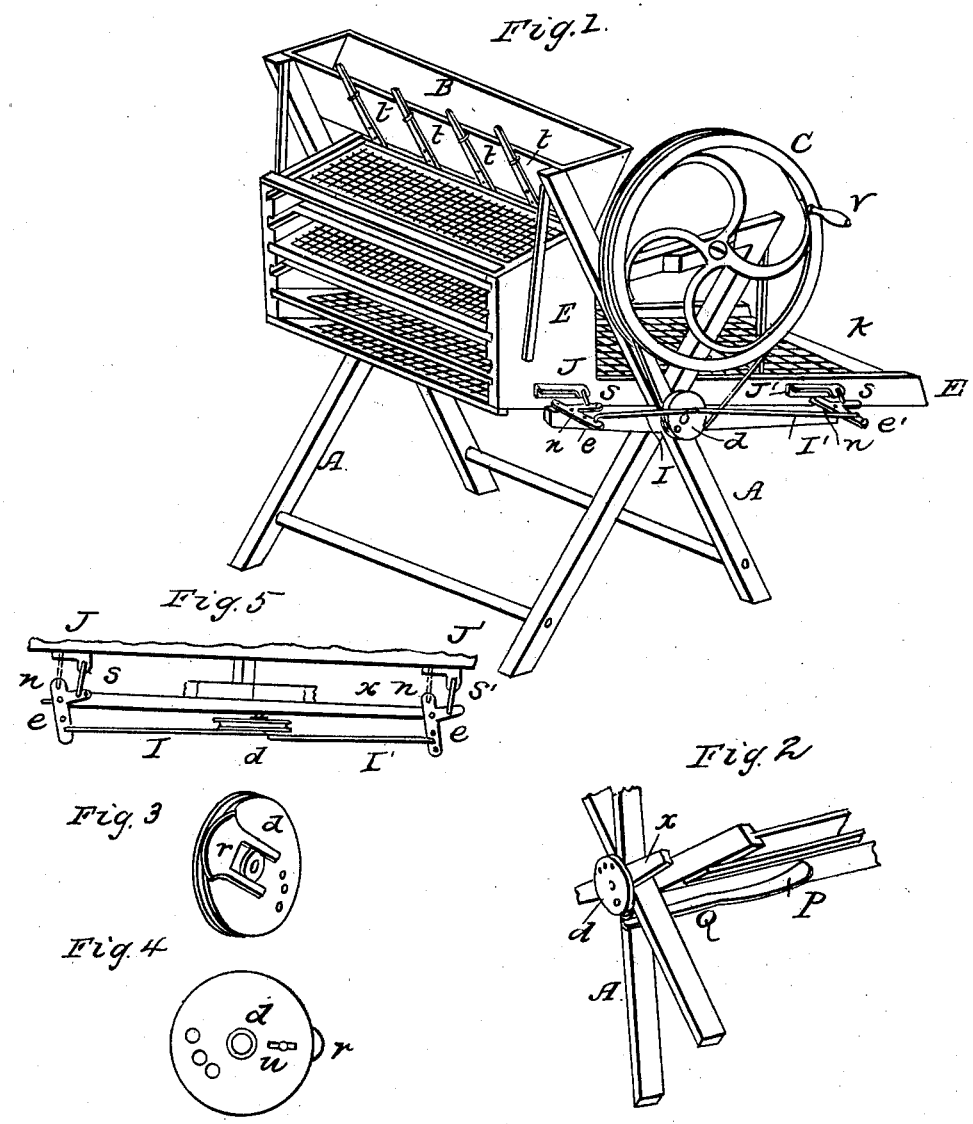

United States Patent Office.

HARRISON OGBORN, OF RICHMOND, INDIANA.

Letters Patent No. 90,291, dated May 18, 1869.

---

IMPROVEMENT IN GRAIN-SEPARATORS.

---

The Schedule referred to in these Letters Patent and making part of the same.

---

*To all whom it may concern:*

Be it known that I, HARRISON OGBORN, of the city of Richmond, and State of Indiana, have invented a new and useful Improvement in Grain and Seed-Separators; and I do hereby declare that the following is a full and exact description thereof, reference being had to the accompanying drawings, making a part of this specification, in which—

Figure 1 is a perspective view.

Figure 2 is a detached section, showing mechanism for producing a vertical vibratory motion to the screen.

Figures 3 and 4 represent a pulley, with an adjustable cam attached.

Figure 5 is a section, showing mechanism for producing lateral vibratory motion of the screen.

The same letters, in the different figures, relate to corresponding parts of the machine.

My invention relates to improved mechanism for imparting lateral and vertical vibratory motion to the screens of fanning-mills, and other grain and seed-separators; and also relates to an improvement in the manner of regulating the discharge of grain from the hoppers of the above-named machines.

To enable others skilled in the art to make and use my invention, I will proceed to describe the same, with reference to the drawings.

E represents the "shoe," provided with a suitable number of screens, and suspended from the upper part of trestle A, in a manner that will admit of its proper vibratory movements.

B represents the hopper, the front side of which is provided with a series of apertures, near the bottom of the hopper, for the discharge of grain.

The apertures, in the hopper, are each provided with gates or levers, t t t t, by which the discharge of grain is regulated, each of which gates or levers acts independently of the others.

The gates are pivoted centrally, upon which they turn for opening or closing the apertures.

The screens are actuated laterally by means of the duplicated devices, consisting of the bell-cranks e and e′, and rods I and I′, the bell-cranks being connected with the screens, by means of plates J and J′, fastened to the sides of the "shoe," the said plates and bell-cranks being joined by rods S and S′.

The rods I and I′ are attached to the pulley d, in a manner admitting of their free operation, by inserting the right-angular end of one rod through the perforated end of the other, the end of the bent rod being inserted in an aperture in the pulley, thus forming a crank, by which motion is imparted to the rods, by means of the pulley, and thus actuating the bell-cranks, and consequently the screens.

Pulley d is connected, by a belt, with wheel C, by which said pulley is rotated, the wheel being turned by means of handle V.

The bell-cranks are pivoted on the horizontal bar X, the latter being rigidly attached to trestle A.

A peculiarity of the bell-cranks e and e′ consists in their being provided with a projection, n, in addition to the two arms forming an angle with each other.

Projection n is provided with a perforation, thus admitting of its being connected with plate J, by means of rod S, the plate being provided with an aperture opposite projection n, to receive the end of rod S, as shown by dotted lines, fig. 5.

The action of the bell-cranks, when the rod S is connected with projection n, is to produce double the number of vibrations of the screen, that is produced when rod S is connected with the arm parallel to the side of the "shoe," by reason of the fact that the action of rod S is on a radial line, cutting the arc described by projection n, centrally; consequently the motion of projection n, through each division of the arc, produces a stroke of rod S, and a different motion of the screen. Thus one stroke of rod I, which would give one stroke of rod S, when the latter is connected with the arm of the crank parallel to the side of the screen, gives two strokes of rod S, when said rod is connected with projection n.

Thus, by means of projection n, the vibrations of the screen may be changed from an ordinary to an unusually rapid movement.

The advantages derived from the double mechanism, for giving lateral motion to the screens, consists in a firm, uniform movement of the screens, or the connection may be so changed as to give the screens a very short, rapid movement at one end, while the vibrations of the opposite end are much longer, which movements are calculated, at times, to produce advantageous results.

P, fig. 2, is a knocker or knocking-lever, the object of which is to jar the screens vertically.

The lever P is pivoted, at Q, to the cross-piece, connecting the legs of the trestle, and is actuated by a cam, r, attached to pulley d, thus striking the projecting end of lever P, at each revolution of pulley d, by which the opposite end of the lever is made to strike a cross-piece attached to the "shoe," beneath the screens K, thus producing the desired jarring of the screens.

Cam r is attached to pulley d in an adjustable manner, by means of the slotted end of the cam working on a central collar or axle, on which the pulley d rotates, and the slot u, in said pulley, through which a screw is inserted into the cam, thus allowing the latter to be easily adjusted to or from the centre of the pulley, by which a greater or less degree of jarring is imparted to the screens, by the action of lever P, or the latter may thus be stopped entirely when desired.

Having thus fully described my said invention,

What I claim, and desire to secure by Letters Patent, is—

1. The shackles $e$ and $e'$, so connected with pulley $d$ and shoe, as to give four vibrations to the shoe to each revolution of the pulley $d$, substantially in the manner set forth.

2. The arrangement of the double bell-cranks, provided with adjusting-holes, whereby a lateral vibrating motion is communicated to the shoe, which motion may be so governed as to produce greater rapidity at one end of the shoe than at the other, substantially as set forth, and for the purpose described.

3. The knocking-lever P, operated by cam $r$, in combination with the screens of a grain or seed-separator, for the purpose set forth.

4. In combination with hopper B, the gates or levers $t$, the latter operating independently of each other, as set forth.

HARRISON OGBORN.

Witnesses:
JOSEPH RIDGE,
LEONIDAS OGBORN.